US012703653B2

(12) United States Patent
Saleh et al.

(10) Patent No.: US 12,703,653 B2
(45) Date of Patent: Aug. 11, 2026

(54) MONITORING SYSTEM FOR A CONTAINER GLASS FORMING MACHINE

(71) Applicant: Cerrion AG, Zurich (CH)

(72) Inventors: Karim Saleh, Zurich (CH); Nikolay Kobyshev, Zurich (CH); Michael Gygli, Zurich (CH)

(73) Assignee: Cerrion AG, Zürich (CH)

( * ) Notice: Subject to any disclaimer, the term of this patent is extended or adjusted under 35 U.S.C. 154(b) by 293 days.

(21) Appl. No.: 18/706,454

(22) PCT Filed: Oct. 21, 2022

(86) PCT No.: PCT/CH2022/050030

§ 371 (c)(1),
(2) Date: May 1, 2024

(87) PCT Pub. No.: WO2023/070233

PCT Pub. Date: May 4, 2023

(65) Prior Publication Data

US 2025/0187967 A1 Jun. 12, 2025

(30) Foreign Application Priority Data

Nov. 1, 2021 (CH) ................................ 70477/2021

(51) Int. Cl.
*C03B 9/41* (2006.01)
*G05B 19/048* (2006.01)
*G06T 7/00* (2017.01)

(52) U.S. Cl.
CPC .............. *C03B 9/41* (2013.01); *G05B 19/048* (2013.01); *G06T 7/0004* (2013.01); *G06T 2207/20084* (2013.01)

(58) Field of Classification Search
CPC .... C03B 9/41; G05B 19/048; G05B 23/0208; G05B 23/024; G06T 2207/10016;
(Continued)

(56) References Cited

U.S. PATENT DOCUMENTS

2011/0141265 A1* 6/2011 Holtkamp ............ G01N 33/386 348/86
2016/0195867 A1 7/2016 Lamers
(Continued)

FOREIGN PATENT DOCUMENTS

EP 1122525 A2 8/2001
EP 2336740 B1 2/2014
WO WO-2021048451 A1 * 3/2021 ............... C03B 9/41

OTHER PUBLICATIONS

International Search Report and Written Opinion for PCT/CH22/50030, filed Oct. 21, 2022.
(Continued)

*Primary Examiner* — Omer S Khan
(74) *Attorney, Agent, or Firm* — Fleit Intellectual Property Law; Paul D. Bianco

(57) ABSTRACT

A monitoring system for a container glass forming machine includes a data acquisition and analyzing unit with at least one coupled sensor, which is controlled by software, running on the unit, records and processes sensor data. At least one visible light camera is connected to the data acquisition and analyzing unit and positioned so that visible light video streams in real time can be taken at least from a blank side section, blow side section, deadplates, and/or transfer conveyor belt and transferred to the data unit. Such visible light video streams are processed by the software based on artificial neural networks, which learned to realize an error or anomaly in the acquired visible light video streams by algorithms in the data acquisition and analyzing unit and in case of detection of an error, an alert to an operator is issued by an alerting and/or feedback unit.

15 Claims, 1 Drawing Sheet

(58) Field of Classification Search
CPC . G06T 2207/20081; G06T 2207/20084; G06T 7/0004
See application file for complete search history.

(56) References Cited

U.S. PATENT DOCUMENTS

| | | | | |
|---|---|---|---|---|
| 2020/0033831 | A1* | 1/2020 | Tauschinsky ........ | G06N 3/0442 |
| 2023/0053561 | A1* | 2/2023 | Diehm .................. | G06T 7/0004 |

OTHER PUBLICATIONS

International Preliminary Report on Patentability dated May 2, 2024 with Written Opinion for PCT/CH22/50030, filed Oct. 21, 2022.

* cited by examiner

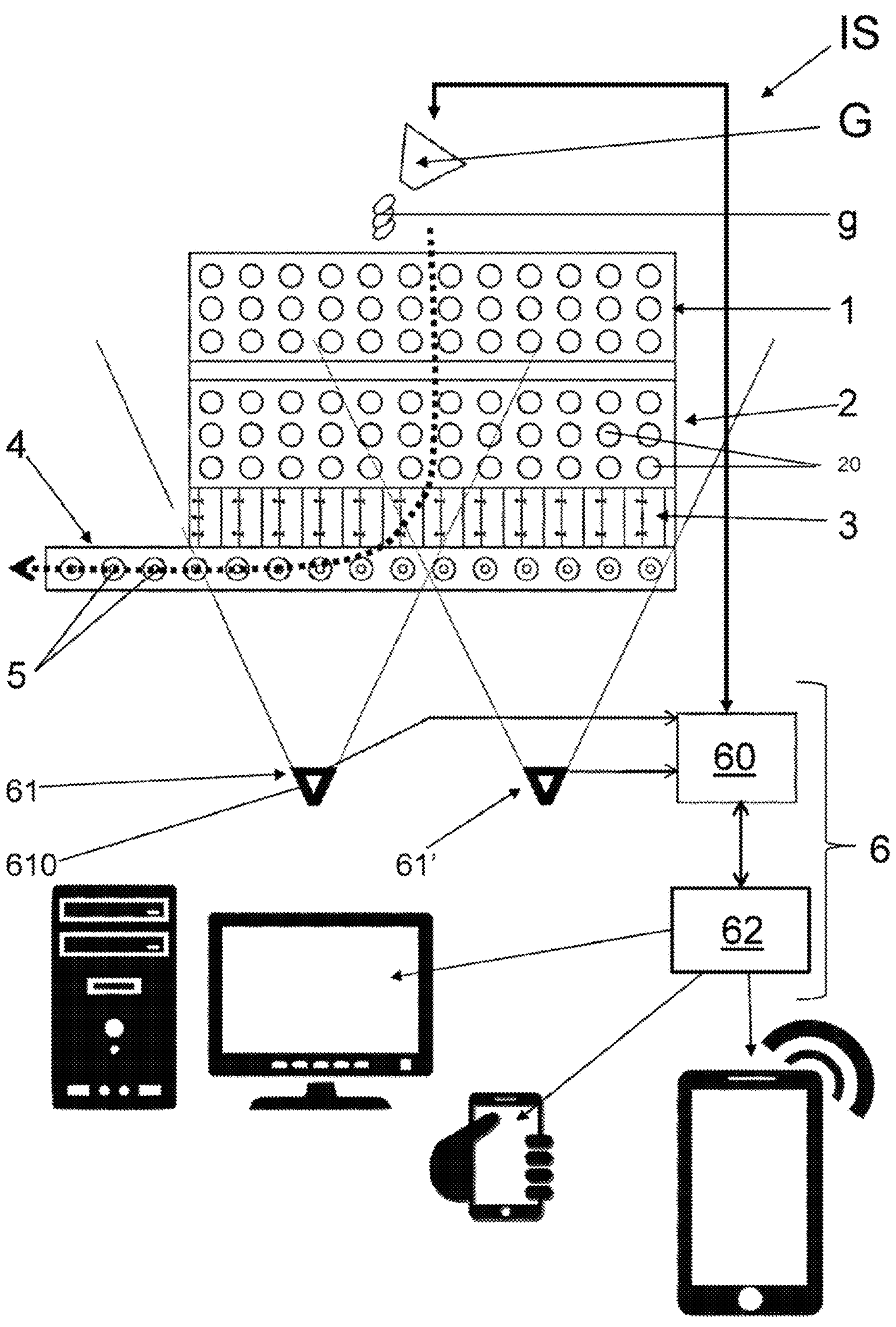
IS
G
g
1
2
20
3
4
5
60
61
610
61'
6
62

MONITORING SYSTEM FOR A CONTAINER GLASS FORMING MACHINE

TECHNICAL FIELD

The present invention describes a monitoring system for a container glass forming machine, for monitoring at least a blank side section and/or a blow side section with individual moulds and/or deadplates and/or a transfer conveyor belt for transport of container, wherein the monitoring system is connected to the container glass forming machine, comprising a data acquisition and analyzing unit with at least one coupled sensor, which is controlled by a software, running on the data acquisition and analyzing unit, recording and processing sensor data, a manufacturing method of glass container with a container glass forming machine, monitored with a monitoring system, use of neural networks for analyzing areas of a container glass forming machine and an upgrade procedure for commercially available container glass forming machines like individual section machines.

STATE OF THE ART

Narrow-mouth containers such as bottles are usually formed by the individual section (IS) machine. An individual sections IS machine for glass glassware forming consists of several individual sections, where each section receives molten glass as gobs in its moulds. The glass is distributed in the form of gobs via the gob distributor. The individual sections produce at high frequency/low cycle times. They are in electronically controlled temporal synchronicity with the gob distributor and temporally offset among them. Anomalies and errors occur in this sophisticated system. Thus, IS-machines known from prior art documents require full-time human monitoring to avoid dire consequences.

Some related systems are known, like EP2336740, and EP1122525 which rely on infrared sensors to measure radiation from individual gobs respectively formed containers on the conveyor belt to detect out of shape bottles. These systems do not directly monitor the blank and blow side of an individual section machine.

The most relevant prior art is WO2021048451, because the system is of preferential application in IS glass machines and in the transport of containers associated with them, wherein the monitoring system detects incidents at the blank and blow side of an individual section machine and during the transport of the containers. The described monitoring system uses artificial vision to detect incidents in the production process of containers and their transport, especially based on infrared sensors. Alert thresholds are once defined by the operator and manually set. Abnormality is defined based on whether there is any large enough luminous object inside a region of interest, i.e. based on thresholds of intensity images. Therewith abnormality is defined as an image which has its intensity outside the defined normality interval. It is disadvantageous, that such system requires ongoing adjustments by the operators to configure valid intensity ranges for each container type and change the alert mode depending on operator presence and their current work. Although these parameters are adjustable, the system seems to be rather static.

DESCRIPTION OF THE INVENTION

The object of the present invention is to create a monitoring system for a glass forming machine with optimized automatic definition of anomalies, independent from the working operator, which results in higher efficiency of detecting anomalies/issues and therewith production process.

In a further preferred embodiment of the present invention the alert mode is automatically adapted to the presence of an operator.

Disclosed are methods and monitoring systems for detecting anomalies in the operation of glass forming machines, most preferred IS-machines and issuing alerts via various means such as wearables, personal computing devices or mobile/smart phones. This system makes full-time human monitoring superfluous. The system consists of one or multiple visible light imaging sensors, producing video streams.

These streams are analyzed by an artificial intelligence, trained to detect abnormal events in multivariate data. The method learns how the data of normal operations is distributed and can alert when the IS-machine does not operate normally. Optionally it is further aware of the presence of human operators. This allows it to adapt its alert mechanisms accordingly and thus avoiding unnecessary alerts when an operator is monitoring or interacting with the machine.

The neural networks can be programmed to continuously learn and improve error detection.

BRIEF DESCRIPTION OF THE DRAWINGS

Further understanding of various aspects of the invention can be obtained by reference to the following detailed description in conjunction with the associated drawing, which is described briefly below.

It should be noted that in the differently described embodiments, the same parts are provided with the same reference symbols or the same component names, the disclosures contained in the entire description being able to be applied analogously to the same parts with the same reference symbols or the same component symbols.

FIG. 1 shows a schematic plan view of an IS machine with visible light sensors, a computational analyzing unit and an alerting unit.

DESCRIPTION

FIG. 1 illustrates an exemplary arrangement of a preferred individual section machine IS as container glass forming machine, comprising a blank side section 1 and a blow side section 2, areas of the individual section machine IS.

In a machine IS usually a stream of molten glass is pushed out of an orifice of a gob distributor G and is subsequently cut to gobs g of glass. The gobs g travel through blank side section 1 and a blow side section 2, where they fit in blow moulds 20 and the glass is blown by compressed air. Via deadplates 3 containers 5 are placed on a transfer conveyor belt 4. Deadplates 3 and the transfer conveyor belt 4 are another areas of the container glass forming machine. After the containers or bottles 5 are produced, they are moved from the blow moulds 20 to the deadplates 3, still per section. The entire process, from gob delivery to finished forming, lasts only. From the deadplates 3, a mechanical arm pushes the hot containers 5 to the transfer conveyor belt 4, where they are cooled and transported to an annealing lehr, not shown. The hole process is controlled by a processing unit, which is not shown here.

During the glass container production with the individual section machine IS, each area or section 1, 2, 3, 4 receives molten glass in its moulds 20. The glass is distributed in the form of gobs g via the gob distributor G. The individual sections produce at high frequency/low cycle times. They are in electronically controlled temporal synchronicity with the gob distributor G and temporally offset among them. Anomalies and errors occur regularly in this complex system.

A monitoring system 6, comprises a data acquisition and analyzing unit 60, at least one visible light camera 61 and an alerting and/or feedback unit 62.

Here, most preferred two visible light cameras 61, 61' are collecting video streams in real time of the blank side section 1 and the blow side section 2, the dead plates 3 as well as the transfer conveyor belt 4 controlled by the data acquisition and analyzing unit 60.

Of course, it is possible to monitor even more areas of the container glass forming machine, for example a ware transfer, a stacker loading area and a hot end coating tunnel, which are not shown in FIG. 1. The whole monitoring system 6, especially the at least one visible light camera 61 must be placed accordingly.

While the gobs g are formed to container 5, cooled and transported, the monitoring system 6 monitors the process with video streams from the visible light cameras 61, 61' are transferred to the data acquisition and analyzing unit 60, in which abnormalities are detected in real time.

The visible light cameras 61, 61' are placed in heat-resistant and self-cleaning cases 610, to achieve a robust structure and long durability in the glass production environment.

During production use, the observed video stream is compared against normal operation using multivariate data analysis. For each region of interest, the data acquisition and analyzing unit 60 analyzes the spatio-temporal information in the camera images, using a software, based on artificial neural networks, such as deep neural networks. A person skilled in artificial intelligence knows possible usable algorithms and can write applicable software.

The artificial intelligence respectively a neural network is trained before commissioning of the monitoring system 6 respectively the individual section machine IS. The artificial intelligence is trained from a given example, here on video streams of the at least one visible light cameras 61, 61' at normal operation and optionally additional anomaly data. By determining the difference between the processed output of the network or a prediction and a target output, the difference equals an error, can be defined. The neural network learns to realize an error or anomaly in the acquired visible video streams.

If the artificial intelligence realizes anomalies and errors in the observed video streams, because the images in a region of interest differ from normality, this is communicated to the alerting and/or feedback unit 62, for example together with information about the affected region of interest.

The alerting and/or feedback unit 62 will then issue an alert to an operator of the individual section machine IS.

With the visible light cameras 61, 61' it can be detected if gobs G or manufactured containers 5 move abnormally, because the spatio-temporal information from the sections 1, 2, 3, 4 include motion information.

Due to use of artificial intelligence methods, abnormal events in the video streams can be detected more broadly, compared to only detecting abnormal light intensity values in single images. Permanent control and manual adjustments by the operator can be avoided by learning how the visual data in normal operations is distributed, abnormal events will be detected and alerts are issued fully automatic.

The alerting and/or feedback unit 62 can have various embodiments. Options include showing alerts to operators via a stationary personal computing device at the machine IS or in a control room, on mobile devices like phones/smart phones and tablets or on a wearable device, which the operator can carry along.

Via the alerting and/or feedback unit 62 or via the data acquisition and analyzing unit 60, the processing unit of the individual section machine IS can directly be controlled, for example by stopping the affected sections 1, 2, 3, 4.

With the monitoring system 6 using the same at least one visible light camera 61, 61' and the data acquisition and analyzing unit 60, the presence of an operator nearby the individual section machine IS or operating the individual section machine IS can also be detected. The data acquisition and analyzing unit 60 is also trained to detect the presence or absence of human operators using visible light sensors and video images in real time. Therewith presence and spatial position of machine operators, as well as abnormal human behavior of the operator can be detected.

Depending on the presence or absence of operators at the machine IS, determined by the data acquisition and analyzing unit 60, the alerting and/or feedback unit 62 will be controlled. While some issues can be resolved with keeping single sections 1, 2, 3, 4 running, when an operator is present, section stop or stop of the whole process is typically advisable when no human operator is present. Therefore, if no operator is present, the alerting and/or feedback unit 62 will send an alert via mobile device to the operator and will stop the individual section machine IS and the actual process of manufacturing.

When an operator is present and the data acquisition and analyzing unit 60 detects for example occlusions of container 5, the alerting and/or feedback unit 62 can send silence alerts to the operator, respectively to stationary device nearby the IS machine.

Depending on the presence/absence of an operator, monitored with the presence sensor, the nature of the alert is in general influenced. If the operator is nearby the machine IS, there is no need for wireless alert signals to wireless devices. In the simplest way, an audio signal in the room of the machine IS could be the alert.

With the presence sensor as part of the monitoring system 6 and connected to the data acquisition and analyzing unit 60, the presence/absence of an operator in real time and/or abnormal human behavior and/or incorrect operation of an operator is detected, influencing the nature of the alert. The presence sensor is able to detect the type of action taken by the operator, including, but not limited, to swabbing, manually checking container quality, tool change and/or mechanical parts change.

Optionally at least one presence sensor, independent from the visible light cameras 61, 61' could be used alone or in addition to the described setup. Also this independent at least one presence sensor has to be connected to the data acquisition and analyzing unit 60.

Optionally the processing unit of the individual section machine IS can form one part with the data acquisition and analyzing unit 60 and the alerting and/or feedback unit 62.

While the software can be based on artificial intelligence, based on a one time trained artificial neural network or multiple networks, the software can be programmed to use continuous learning processes. Therewith the once trained artificial intelligence can be continuously improved to improve error detection optionally.

The monitoring system 6 presented here can be used to upgrade existing commercially available container glass forming machines like individual section machines IS, with or without other monitoring systems for improving their efficiency.

We are the first using neural networks via software and data acquisition and analyzing unit 60 for analyzing areas 1, 2, 3, 4 of a container glass forming machine, by analyzing video streams in real time, taken by the at least one visible light camera 61, 61' in combination with the data acquisition and analyzing unit 60 and if necessary creating alerts via the alerting and/or feedback unit 62.

LIST OF REFERENCE NUMERALS container glass forming machine
IS Individual section machine/G
G gob distributor/container distributor
g gob (becomes bottle or container)
1 blank side section
2 blow side section
20 blow moulds
3 deadplates
4 transfer conveyor belt
5 container (or bottle)
processing unit
6 monitoring system
60 data acquisition and analyzing unit
61 visible light camera (at least one, better 2 □ video streams)
610 Heat-resistant cases and self-cleaning cases
62 alerting and/or feedback unit (alert signal to operator/stop signal to gob distributor)
alert indicator
operator presence sensor (can be 61)
software (self learning, AI)

The invention claimed is:

1. A monitoring system for a container glass forming machine, for monitoring at least a blank side section, a blow side section with individual molds, deadplates, and/or a transfer conveyor belt for transport of container, wherein the monitoring system is connected to the container glass forming machine, wherein the monitoring system comprises a data acquisition and analyzing unit with at least one coupled sensor, which is controlled by software, running on the data acquisition and analyzing unit, recording and processing sensor data, wherein the at least one sensor is at least one visible light camera, connected to the data acquisition and analyzing unit and placed in such a way that visible light video streams in real time can be taken at least from the blank side section, the blow side section, the deadplates, and/or the transfer conveyor belt and transferred to the data acquisition and analyzing unit, said visible light video streams are processed by the software based on artificial neural networks, which learned to detect an error or anomaly in the acquired visible light video streams by algorithms in the data acquisition and analyzing unit, and wherein in case of detection of an error, an alert to an operator is issued by an alerting and/or feedback unit on a stationary personal computing device or on a mobile device and/or the manufacturing process is stopped by feedback signal via the alerting and/or feedback unit to a processing unit of the container glass forming machine;

wherein with a presence sensor as part of the monitoring system and connected to the data acquisition and analyzing unit, at least one of the presence or absence of an operator in real time, abnormal human behavior, and type of operation taken by an operator, is detected, influencing the nature of the alert.

2. The monitoring system according to claim 1, wherein the software is based on a continuously trained artificial neural network, continuously improving error detection.

3. The monitoring system according to claim 1, wherein the presence sensor is the at least one visible light camera.

4. The monitoring system according to claim 1, wherein the type of operation taken by the operator includes at least one of swabbing, manually checking container quality, a tool change, and a mechanical parts change.

5. The monitoring system according to claim 1, wherein the at least one visible light camera is placed in at least one heat-resistant and self-cleaning case.

6. The monitoring system according to claim 1, wherein the at least one visible light camera includes at least two visible light cameras for monitoring at least the blank side section, the blow side section, the deadplates, and/or the transfer conveyor belt of an individual section machine.

7. The monitoring system according to claim 1, wherein a stop feedback signal is sent from the alerting and/or feedback unit via the data acquisition and analyzing unit to the processing unit of the container glass forming machine.

8. The monitoring system according to claim 1, wherein the processing unit of the container glass forming machine forms one part with the data acquisition and analyzing unit and the alerting and/or feedback unit.

9. The monitoring system according to claim 1, wherein the mobile device is a mobile phone, a smart phone, a tablet, or a wearable device.

10. The monitoring system according to claim 1, wherein in case of detection of an error the manufacturing process is stop in at least one of the blank side section, the blow side section, the deadplates, and the transfer conveyor belt.

11. A manufacturing method of a glass container with a container glass forming machine, monitored with the monitoring system according to claim 1, the method comprising:

pushing a stream of molten glass from a gob distributor subsequently cut to gobs in the blank side section and subsequently the blow side section, the deadplates on the transfer conveyor belt controlled by the processing unit, monitoring in real time and producing video streams with the at least one visible light camera, transferring and analyzing the video streams with data acquisition and analyzing unit, wherein video data is processed in the data acquisition and analyzing unit by the software based on artificial neural networks, which learned to realize an error or anomaly in the acquired visible video streams by algorithms in the data acquisition and analyzing unit, before wherein an alert is sent after error detection to an operator by the alerting and/or feedback unit on a stationary personal computing device or on a mobile device and/or wherein the manufacturing process is manipulated in one or all of the blank side section, the blow side section, the deadplates, and the transfer conveyor belt via signals from the alerting and/or feedback unit to the processing unit of the container glass forming machine;

wherein the monitoring system provides a presence sensor, connected to the data acquisition and analyzing unit, detecting at least one of the presence or absence of an operator, abnormal human behavior, and type of action taken by the operator in real time, while the production process is running, and wherein an alert matched to the presence of the operator is sent via the alerting and/or feedback unit to the stationary personal computing device or the mobile device to the operator.

12. The manufacturing method according to claim 11, wherein the software is based on a continuously trained artificial neural networks, continuously improving error detection and possible alerting.

13. The manufacturing method according to claim 11, wherein the presence sensor is a visible light camera.

14. The manufacturing method according to claim 13, wherein the data acquisition and analyzing unit is also trained software based on artificial neural networks, for detecting presence or absence of human operators using the visible light cameras and their video images in real time, which can trigger an alert by the connected alerting and/or feedback unit.

15. A method of upgrading a commercially available container glass forming machine like individual section machines, the method comprising adding the monitoring system according to claim 1 to the individual section machines.

* * * * *